(12) United States Patent
Tiana (10) Patent No.: US 12,130,374 B2
(45) Date of Patent: Oct. 29, 2024

(54) OPTICAL REFERENCE FOR INERTIAL DRIFT MITIGATION

(71) Applicant: Rockwell Collins, Inc., Cedar Rapids, IA (US)

(72) Inventor: Carlo L. Tiana, Portland, OR (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 218 days.

(21) Appl. No.: 16/910,995

(22) Filed: Jun. 24, 2020

(65) Prior Publication Data

US 2021/0405147 A1    Dec. 30, 2021

(51) Int. Cl.
*G01S 5/16* (2006.01)

(52) U.S. Cl.
CPC ........................ *G01S 5/16* (2013.01)

(58) Field of Classification Search
None
See application file for complete search history.

(56) References Cited

U.S. PATENT DOCUMENTS

| | | | |
|---|---|---|---|
| 5,023,943 A | 6/1991 | Heberle | |
| 6,049,747 A | 4/2000 | Nakajima et al. | |
| 8,825,435 B2 | 9/2014 | Smid et al. | |
| 9,075,127 B2 | 7/2015 | Hess et al. | |
| 9,495,585 B2 | 11/2016 | Bicer et al. | |
| 9,607,387 B2 | 3/2017 | Okuyan et al. | |
| 9,874,931 B1 * | 1/2018 | Koenck | G06F 3/012 |
| 9,891,705 B1 * | 2/2018 | Lahr | G06K 9/2054 |
| 10,247,613 B1 * | 4/2019 | Wald | G01B 11/26 |
| 10,466,779 B1 * | 11/2019 | Liu | G02B 27/017 |
| 10,775,881 B1 | 9/2020 | Lahr et al. | |
| 11,280,872 B1 * | 3/2022 | Godil | G01S 3/782 |
| 2007/0273983 A1 * | 11/2007 | Hebert | G02B 27/0172 |
| | | | 359/708 |
| 2008/0218434 A1 | 9/2008 | Kelly et al. | |
| 2010/0109976 A1 | 5/2010 | Gilbert et al. | |
| 2012/0081564 A1 * | 4/2012 | Kamiya | G02B 23/125 |
| | | | 348/216.1 |
| 2012/0218101 A1 * | 8/2012 | Ford | G01S 1/7032 |
| | | | 340/8.1 |
| 2013/0182414 A1 * | 7/2013 | Fedewa | A42B 3/0446 |
| | | | 362/106 |

(Continued)

FOREIGN PATENT DOCUMENTS

| | | | |
|---|---|---|---|
| CN | 105353347 B | * 10/2017 | ............... G01S 5/16 |
| CZ | 2013752669 B6 | 4/2017 | |

OTHER PUBLICATIONS

Extended Search Report for European Application No. 21181527.9 dated Nov. 25, 2021, 11 pages.

(Continued)

*Primary Examiner* — Shelby A Turner
*Assistant Examiner* — Brandon J Becker
(74) *Attorney, Agent, or Firm* — Suiter Swantz IP (57) ABSTRACT

An inertial head-tracking system includes light emitting diodes (LEDs) and photoreceptors. The LEDs and photoreceptors are positioned around the environment and helmet respectively. A processor periodically receives measurements from the photoreceptors and resets inertial drift based on those measurements. Either the LEDs or the photoreceptors are constrained to a specified range to allow for more accurate drift estimation.

13 Claims, 6 Drawing Sheets

(56) References Cited

U.S. PATENT DOCUMENTS

| | | | |
|---|---|---|---|
| 2014/0362370 | A1 | 12/2014 | Bickerstaff et al. |
| 2017/0308159 | A1* | 10/2017 | Yoon .................. G02B 27/0176 |
| 2017/0352160 | A1 | 12/2017 | Tanaka |
| 2018/0266847 | A1 | 9/2018 | Trythall et al. |
| 2018/0322335 | A1 | 11/2018 | Golan et al. |
| 2019/0094989 | A1 | 3/2019 | Chen |
| 2020/0214559 | A1* | 7/2020 | Krueger .................. A61B 5/163 |
| 2020/0355929 | A1* | 11/2020 | Zhang ................ G02B 27/0179 |
| 2021/0133447 | A1* | 5/2021 | Babu ........................ H04W 4/48 |

OTHER PUBLICATIONS

Ercan, Munir, (2010). A 3D Topological Tracking System for Augmented Reality [Unpublished Master's Thesis] Middle East Technical University.

Hutson, Malcolm et al., (2011). JanusVF: Accurate navigation using SCAAT and virtual fiducials. Visualization and Computer Graphics, IEEE Transactions on. 17. 3-13. 10.1109/TVCG.2010.91.

Murphy-Chutorian, Erik et al., "Head Pose Estimation and Augmented Reality Tracking: An Integrated System and Evaluation for Monitoring Driver Awareness", IEE Transactions on Intelligent Transportation Systems, vol. 11 No. 2, Jun. 2010, pp. 300-311.

Murphy-Chutorian, Erik et al., "Head Pose Estimation in Computer Vision: A Survey," in IEEE Transactions on Pattern Analysis and Machine Intelligence, vol. 31, No. 4, pp. 607-626, Apr. 2009, doi: 10.1109/TPAMI.2008.106.

Ross, D.A.,. et al., Incremental Learning for Robust Visual Tracking. Int J Comput Vis 77, 125-141 (2008). https://doi.org/10.1007/s11263-007-0075-7.

S. Jha, et al., "The Multimodal Driver Monitoring Database: A Naturalistic Corpus to Study Driver Attention," in IEEE Transactions on Intelligent Transportation Systems, doi: 10.1109/TITS.2021.3095462.

Shewell, C., et al., (2017). Indoor localisation through object detection within multiple environments utilising a single wearable camera. Health and technology, 7(1), 51-60. https://doi.org/10.1007/s12553-016-0159-x.

Extended European Search Report dated May 3, 2023; European Application No. 21181527.9.

* cited by examiner

OPTICAL REFERENCE FOR INERTIAL DRIFT MITIGATION

BACKGROUND

Inertial head-tracking systems are compact and low cost, but drift rates over time are inadequate for precision pointing applications. Methods for "ground truth reference" are applied on a regular interval to correct drift misalignment. Existing methods to correct drift, such as inertial optical blend, require expensive cameras and/or are computationally intensive.

SUMMARY

In one aspect, embodiments of the inventive concepts disclosed herein are directed to a system of light emitting diodes (LEDs) and photoreceptors. The LEDs and photoreceptors are positioned around the environment and head worn goggles or helmet respectively. A processor periodically receives measurements from the photoreceptors and resets inertial drift based on those measurements.

In a further aspect, either the LEDs or the photoreceptors are constrained to a specified range to allow for more accurate drift estimation.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1*a*, 1*b*). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a pose tracking and verification system for determining poses from fiducials with coded dimensional features. While specific embodiments described herein are directed toward head-tracking systems, the principles described are generally applicable to any system with one or more cameras rigidly affixed to one body and one or more fiducials with coded features rigidly affixed to a second body.

Figure 1:
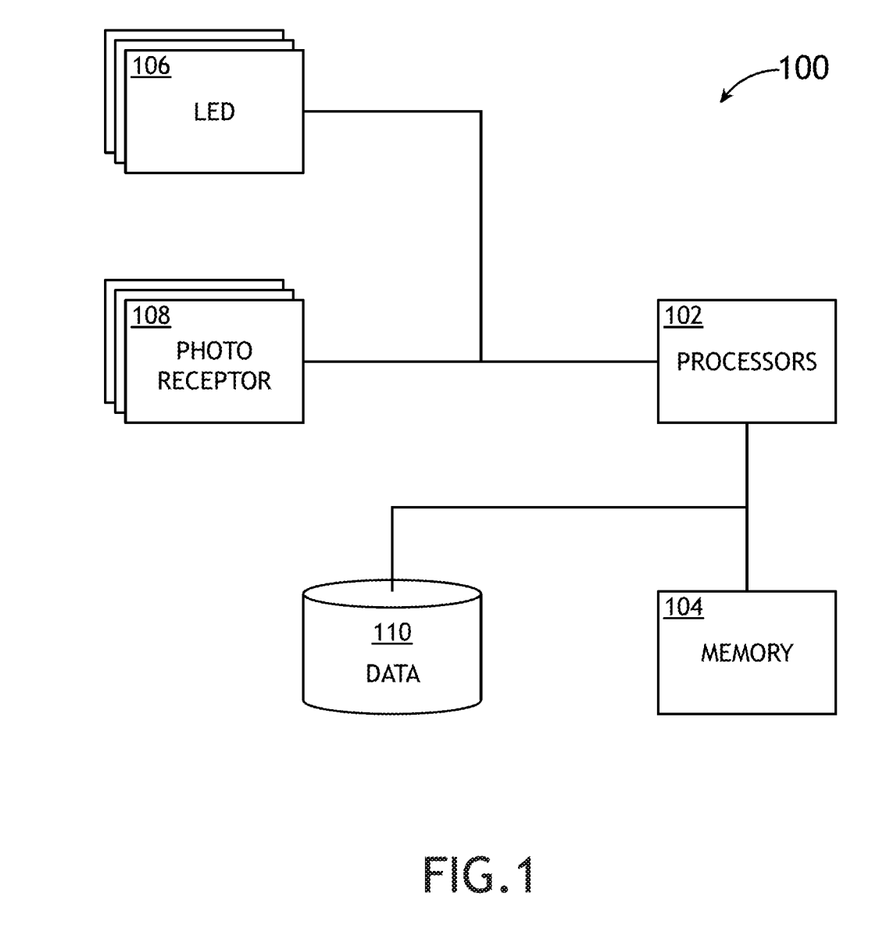
FIG. 1 shows a block diagram of a system useful for implanting exemplary embodiments.

Referring to FIG. 1, a block diagram of a system 100 useful for implanting exemplary embodiments is shown. The system 100, embodied in or working in conjunction with an inertial head-tracking system, includes a processor 102, memory 104 in data communication with the processor 102 for embodying processor executable code, a plurality of LEDs 106, and a plurality of photoreceptors 108 in data communication with the processor 102. The plurality of LEDs 106 may or may not be in data communication with the processor 102.

During inertial head-tracking, head pose estimates deviate over time. In at least one embodiment, the processor 102 is configured to determine a drift correction by periodically receiving values from the photoreceptors 108 corresponding to an intensity of light from the LEDs 106. The intensity values generally correspond to more or less direct exposure the LEDs 106. Multiple, contemporaneous photoreceptor values may be combined to identify an estimated head pose; the estimated head pose is compared to head pose determined via inertial head-tracking. The difference between the estimated head pose and the inertial head-tracking determined pose may comprise a measure of drift. A correction factor is determined based on the difference and the correction factor is applied to future inertial head-tracking poses until the next drift determination.

Alternatively, or in addition, the processor 102 may receive a head pose from an inertial head-tracking system and determine anticipated photoreceptor intensity values. The anticipated photoreceptor values may be compared to received photoreceptor values to determine a drift correction.

In at least one embodiment, the LEDs 106 are adapted to operate in a wavelength that is not visible to the human eye to avoid distracting pilots, for night-vision compatibility, for sunlight rejection. Combinations of LEDs 106 and photoreceptors 108 may be adapted to operate in distinct wavelengths such that photoreceptors 108 only register light from one or more specific LEDs 106. Such embodiments may operate with greater accuracy within a limited range of likely head poses.

In at least one embodiment, each of the LEDs 106 may be configured to flash at a specific frequency such that corresponding photoreceptors 108 may distinguish received intensity values. For example, a photoreceptor 108 may periodically register a first intensity at a first frequency; likewise, the same photoreceptor 108 may periodically register a second intensity at a second frequency. Furthermore, other photoreceptors 108 may similarly receive intensity values at those frequencies; the disparity in intensity values may be used to triangulate the relative position of each LED 106 with respect to the photoreceptors 108, and thereby produce an estimated head pose.

In at least one embodiment, the system 100 further comprises a data storage element 110 in data communication with the at least one processor 102. The data storage element may store relational values associating photoreceptor values with an estimated head pose.

Figure 2:
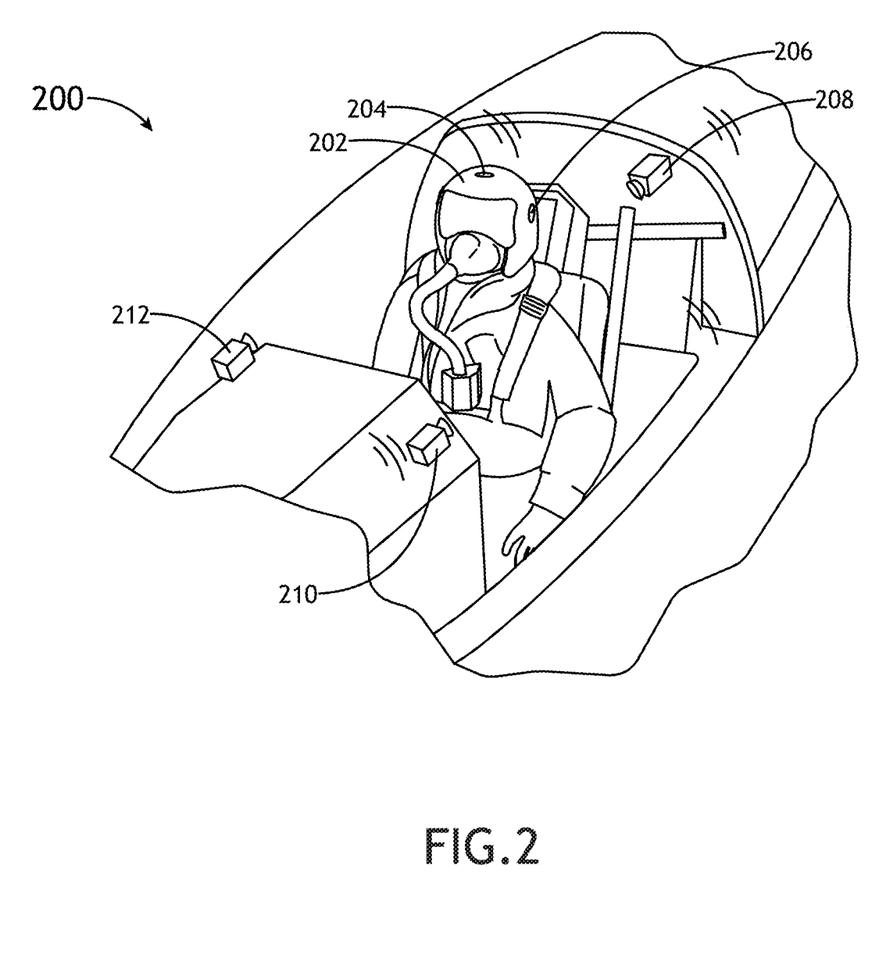
FIG. 2 shows a perspective, environmental view according to an exemplary embodiment.

Referring to FIG. 2, a perspective, environmental view according to an exemplary embodiment is shown. An aircraft cockpit 200 utilizing an inertial head-tracking system may include a drift correction system. The drift correction system determines drift correction values for head poses of a pilots helmet 202 based on a head pose determined by the inertial head-tracking system and the relative locations of light sources 204, 206 disposed on the helmet 202 with respect to photoreceptors 208, 210, 212 disposed at known locations around the cabin.

Alternatively, in at least one embodiment, light sources may be disposed about the cabin while the photoreceptors are disposed on the helmet 202. Furthermore, existing in cabin light sources may be utilized provided they are sufficiently distinguishable by the corresponding photoreceptors.

Light sources 204, 206 and photoreceptors 208, 210, 212 may be disposed to substantially isolate specific light source 204, 206 and photoreceptor 208, 210, 212 pairs to limit interference when the helmet 202 is within a range of expected values.

Figure 3:
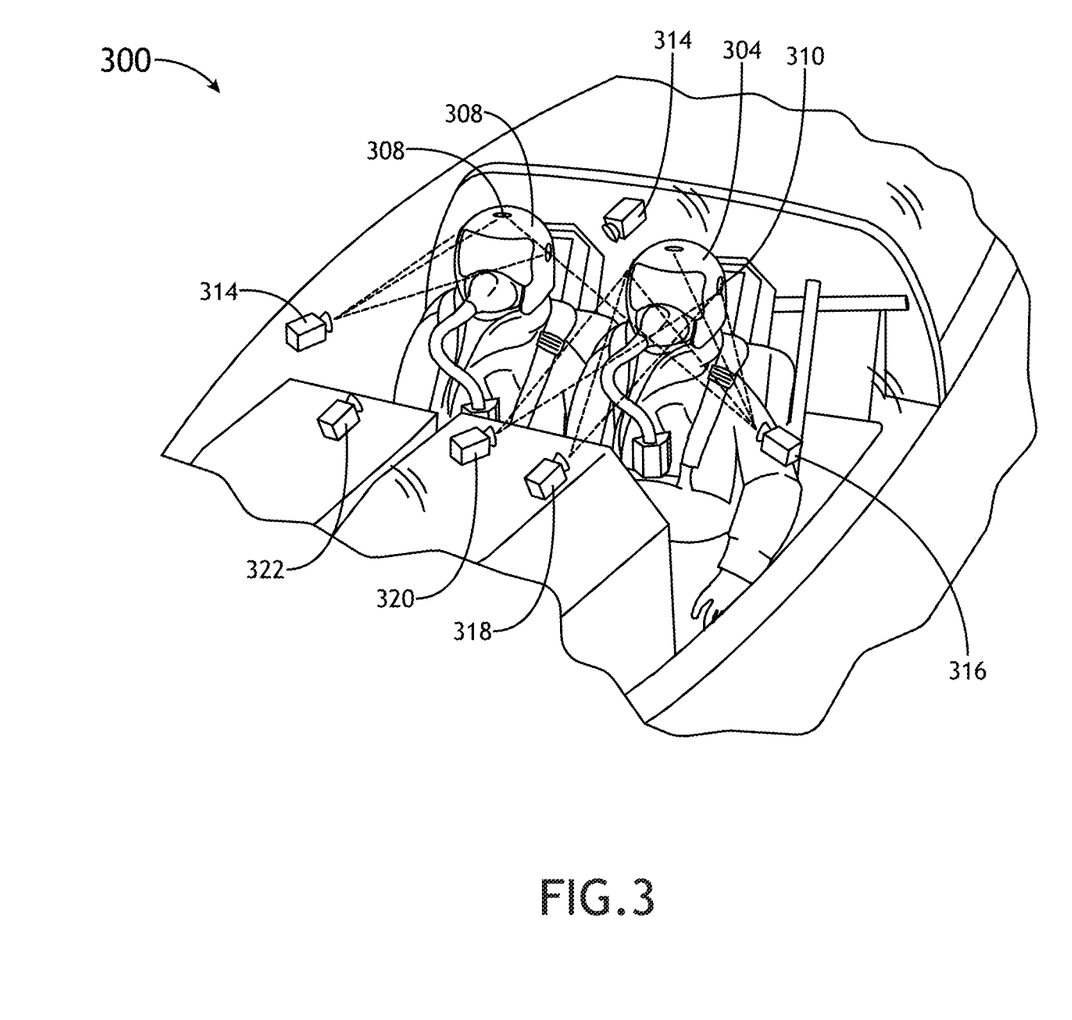
FIG. 3 shows a perspective, environmental view according to an exemplary embodiment.

Referring to FIG. 3, a perspective, environmental view according to an exemplary embodiment is shown. An aircraft cockpit 300 utilizing an inertial head-tracking system may include a drift correction system. The drift correction system determines drift correction values for head poses of multiple pilots' helmets 302, 304 based on head poses determined by the inertial head-tracking system and the relative locations of light sources 306, 308, 310, 312 disposed on the helmets 302, 304 with respect to photoreceptors 314, 316, 318, 320, 322, 324 disposed at known locations around the cabin. Light sources 306, 308, 310, 312 may be configured to distinguish a first helmet 302 from a second helmet 304. For example, a first set of light sources 306, 308 associated with the first helmet 302 and a second set of light sources 310, 312 associated with the second helmet 304 may be operated exclusively such that the first set of light sources 306, 308 and the second set of light sources 310, 312 are not on at the same time. A single set of photoreceptors 314, 316, 318, 320, 322, 324 may thereby identify drift correction values for more than one helmet 302, 304.

Alternatively, in at least one embodiment, light sources may be disposed about the cabin while the photoreceptors are disposed on the helmets 302, 304. Furthermore, existing in cabin light sources may be utilized provided they are sufficiently distinguishable by the corresponding photoreceptors.

Figure 4:
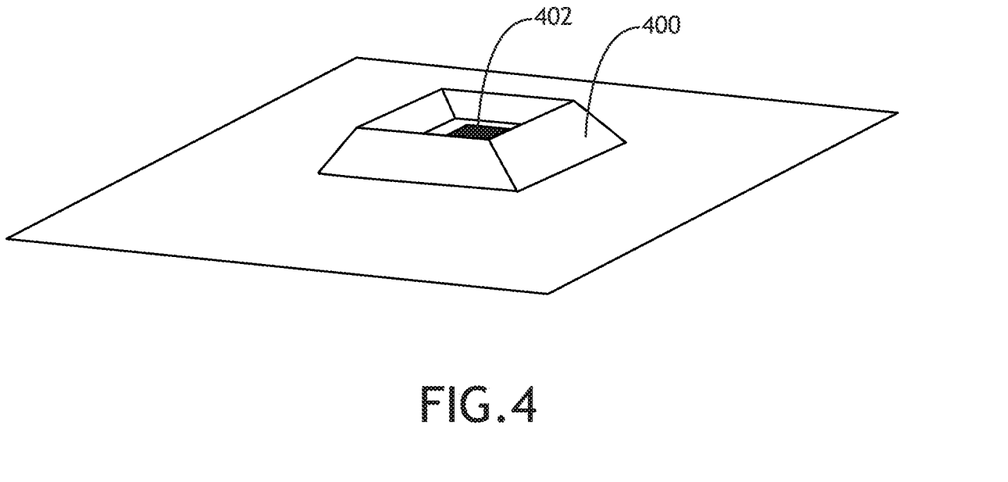
FIG. 4 shows a range restriction element according to an exemplary embodiment.

Referring to FIG. 4, a range restriction element 400 according to an exemplary embodiment is shown. In at least one embodiment, it may be advantageous to restrict the field of view of a photoreceptor 402 to exclude some of a plurality of light sources and enhance the accuracy of the drift correction system.

Figure 5:
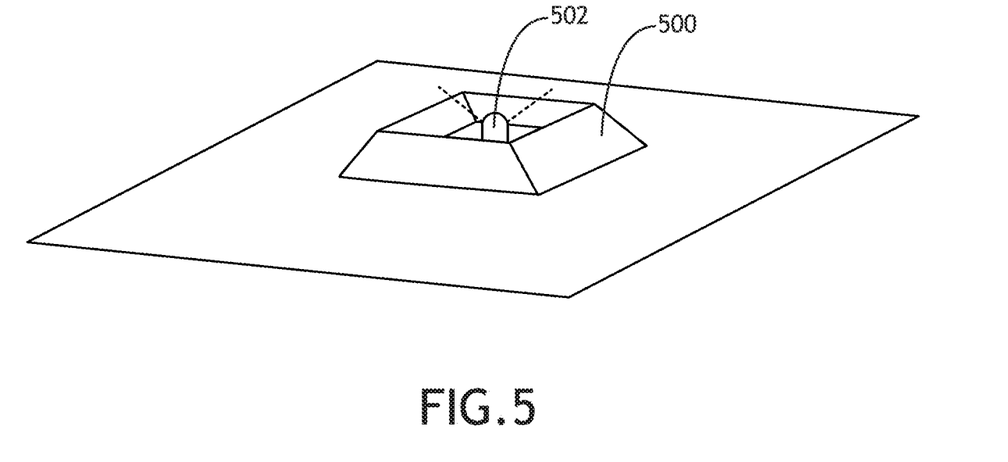
FIG. 5 shows a range restriction element according to an exemplary embodiment.

Referring to FIG. 5, a range restriction element 500 according to an exemplary embodiment is shown. In at least one embodiment, it may be advantageous to restrict the field of illumination of a light source 502 to focus light on specific photoreceptors to enhance the accuracy of the drift correction system.

It may be appreciated that a combination of photoreceptor range restriction elements (FIG. 4) and light source range restriction elements (FIG. 5) may be employed.

Figure 6:
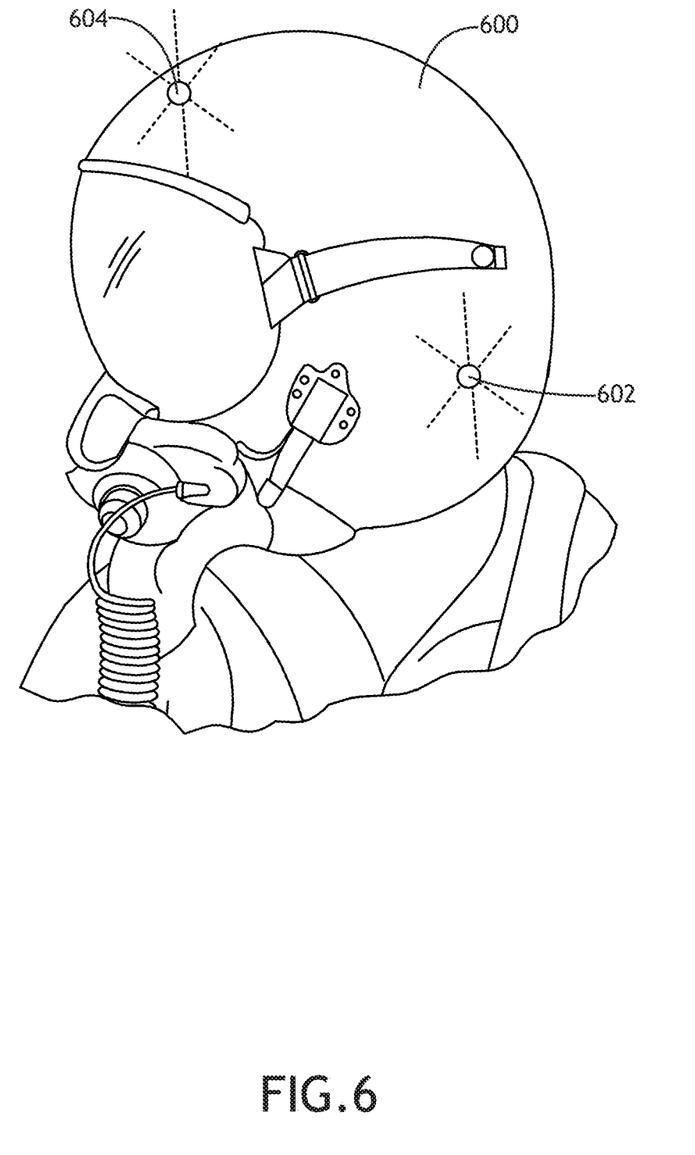
FIG. 6 shows a helmet according to an exemplary embodiment.

Referring to FIG. 6, a helmet 600 according to an exemplary embodiment is shown. In at least one embodiment, the helmet 600 comprises a plurality of light sources 602, 604 disposed at locations identified to be easily registered via photoreceptors disposed at known locations in a cockpit, and easily distinguishable from each other. Furthermore, the light sources 602, 604 may be disposed to register predictably changing values as a function of head pose; for example, a first light source 602 may produce a linearly diminishing intensity value at a photoreceptor as the helmet turns about a vertical axis, while a second light source 604 may produce a linearly diminishing intensity value at a photoreceptor as the helmet inclines or declines about a vertical axis.

It may be appreciated that, while embodiments are shown depicting light sources 602, 604 disposed on the helmet 600, all of the same principles may be applied to a system where the light sources are disposed about the cockpit and the photoreceptors are disposed on the helmet 600.

It may be appreciated that while embodiments are shown with light sources 602, 604 disposed on a helmet 600, other embodiments are envisioned. For example, in at least one embodiment, a pilot may have goggles with embedded light sources 602, 604. Such embodiment may allow for a more compact form while still closely associating the light sources 602, 604 with the pilot's eyes.

Figure 7:
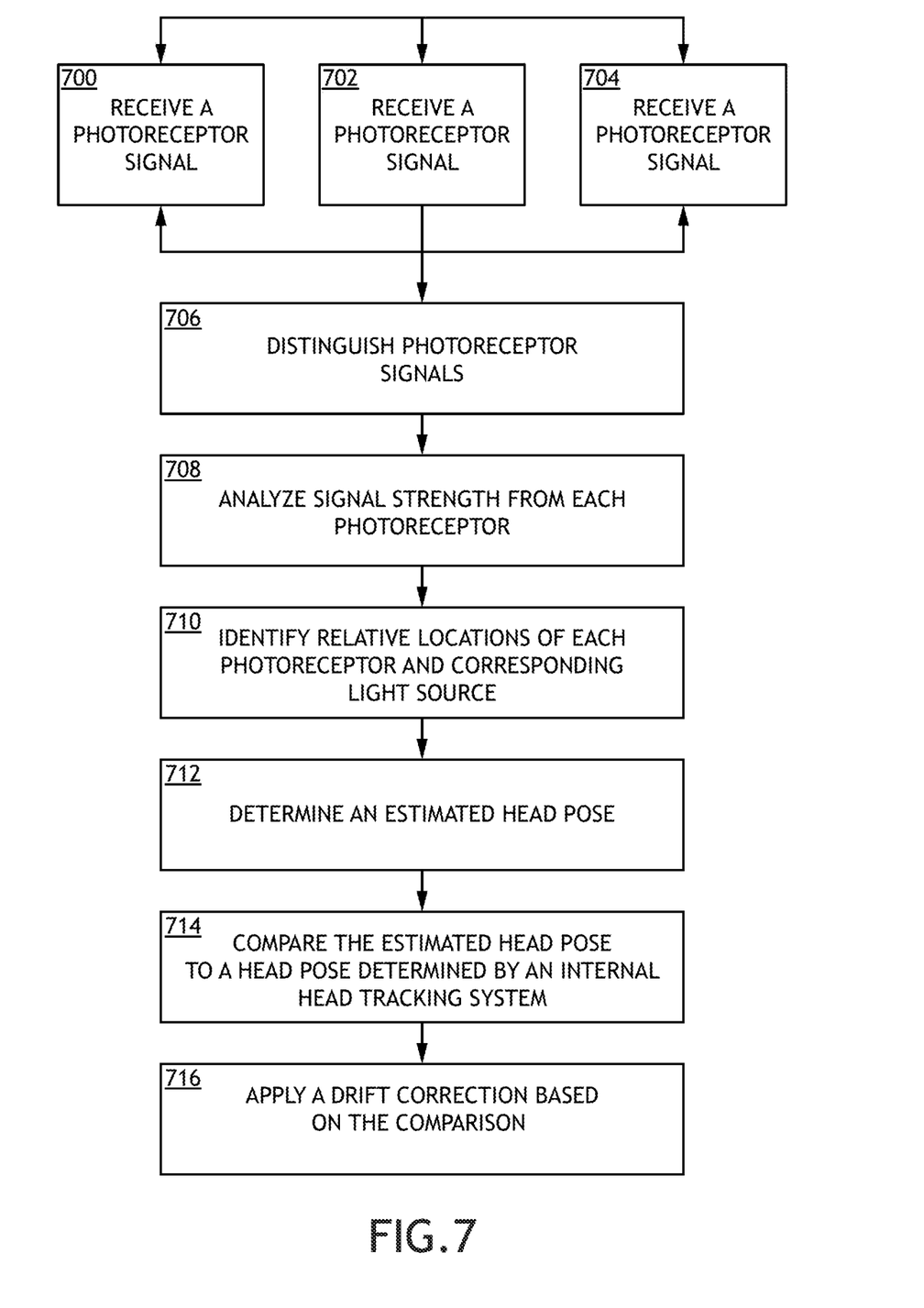
FIG. 7 shows a flowchart for a method of correcting drift according to an exemplary embodiment.

Referring to FIG. 7, a flowchart for a method of correcting drift according to an exemplary embodiment is shown. Photoreceptor signals are received 700, 702, 704 from a plurality of photoreceptors; each signal corresponding to light source intensities. The photoreceptor signals are distinguished 706; for example, via separation in time (light sources exclusively operated within millisecond windows), distinct flashing frequencies in each light source, distinct operating wavelength of each light source, etc.

Based on the distinguished signals, signal strengths are analyzed 708 and relative locations of each photoreceptor and light source are identified 710. In at least one embodiment, the photoreceptors are disposed at known locations and the light sources are disposed relative to each other; in other embodiments, the light sources are disposed at known locations and the photoreceptors are disposed relative to each other. In at least one embodiment, locations may be determined via triangulation algorithms specific to the disposition of the elements. Alternatively, a neural network algorithm may be trained via associations of photoreceptor values and locations or head poses.

In at least one embodiment, an estimated head pose is determined 712 based on the identified locations of the elements. The estimated head pose is compared 714 to a head pose determined via an inertial head-tracking system. The difference of the estimated pose and output of the inertial head tacking system comprises a drift correction factor. The drift correction factor is applied 716 to future inertial head poses until the next drift correction factor is determined. In at least one embodiment, the method is applied periodically; for example, every ten seconds.

In at least one embodiment, neural network algorithms may be trained to produce a drift correction based on photoreceptor inputs and inertial head-tracking inputs.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The form herein before described being merely an explanatory embodiment thereof, it is the intention of the following claims to encompass and include such changes. Furthermore, any of the features disclosed in relation to any of the individual embodiments may be incorporated into any other embodiment.

What is claimed is:

1. An inertial head-tracking system comprising:
   a plurality of light emitting diodes (LEDs), a first set of LEDs disposed on a first helmet and a second set of LEDs disposed on a second helmet;
   a plurality of photoreceptors; and
   at least one processor in data communication with the plurality of photoreceptors and a memory storing processor executable code to configure the at least one processor to:
      receive a signal from each of the plurality of photoreceptors, each signal corresponding to light from one or more of the plurality of LEDs;
      determine a relative location of each of the plurality of LEDs and plurality of photoreceptors;
      produce an estimated head pose for each of the first helmet and the second helmet based on the determined relative locations;
      receive a determined head pose for each of the first helmet and the second helmet based on inertial head-tracking;
      compare the estimated head poses to the determined head poses;
      produce a set of anticipated photoreceptor intensity values based on the determined head poses;
      compare the anticipated photoreceptor intensity values to the signals from each of the plurality of photoreceptors;
      determine a drift correction factor based on one of the comparisons; and
      apply the drift correction factor to subsequent head tracking poses,
      wherein the first set of LEDs and the second set of LEDs are illuminated exclusively such that the first set of LEDs and the second set of LEDs are not illuminated at the same time.

2. The inertial head-tracking system of claim 1, wherein the plurality of LEDs and plurality of photoreceptors are configured to operate in a wavelength invisible to a human eye.

3. The inertial head-tracking system of claim 1, wherein the plurality of LEDs and plurality of photoreceptors define sets of LEDs and photoreceptors, each set configured to operate in a distinct wavelength.

4. The inertial head-tracking system of claim 1, wherein each LED in the plurality of LEDs is configured to flash at a distinct frequency.

5. The inertial head-tracking system of claim 1, further comprising a range restriction element associated with each photoreceptor in the plurality of photoreceptors.

6. The inertial head-tracking system of claim 1, further comprising a range restriction element associated with each LED in the plurality of LEDs.

7. The inertial head-tracking system of claim 1, wherein determining the relative location of each of the plurality of LEDs and plurality of photoreceptors comprises applying a trained neural network algorithm to the signals.

8. A method for correcting drift in an inertial head-tracking system comprising:
   receiving a signal from each of a plurality of photoreceptors, each signal corresponding to light from one or more of a plurality of LEDs, a first set of LEDs disposed on a first helmet and a second set of LEDs disposed on a second helmet;
   determining a relative location of each of the plurality of LEDs and plurality of photoreceptors;
   producing an estimated head pose for each of the first helmet and the second helmet based on the determined relative locations;
   receiving a determined head pose for each of the first helmet and the second helmet based on inertial head-tracking;
   comparing the estimated head poses to the determined head poses;
   producing a set of anticipated photoreceptor intensity values based on the determined head poses;
   comparing the anticipated photoreceptor intensity values to the signals from each of the plurality of photoreceptors;
   determining a drift correction factor based on one of the comparisons; and applying the drift correction factor to subsequent head tracking poses, wherein the first set of LEDs and the second set of LEDs are illuminated exclusively such that the first set of LEDs and the second set of LEDs are not illuminated at the same time.

9. The method of claim 8, wherein the plurality of LEDs and plurality of photoreceptors are configured to operate in a wavelength invisible to a human eye.

10. The method of claim 8, wherein the plurality of LEDs and plurality of photoreceptors define sets of LEDs and photoreceptors, each set configured to operate in a distinct wavelength.

11. The method of claim 8, further comprising flashing each LED at a distinct frequency.

12. The method of claim 8, wherein determining the relative location of each of the plurality of LEDs and plurality of photoreceptors comprises applying a trained neural network algorithm to the signals.

13. The method of claim 8, wherein determining the drift correction comprises applying a trained neural network algorithm to the signals and the determined head pose.

\* \* \* \* \*